United States Patent [19]

Wissman et al.

[11] Patent Number: 4,856,010
[45] Date of Patent: Aug. 8, 1989

[54] LASER FREQUENCY CONTROL

[75] Inventors: Charles H. Wissman; Michael T. Braski, both of Carlsbad, Calif.

[73] Assignee: Hughes Aircraft Company, Los Angeles, Calif.

[21] Appl. No.: 220,632

[22] Filed: Jul. 18, 1988

[51] Int. Cl.⁴ .............................................. H01S 3/13
[52] U.S. Cl. ........................................ 372/32; 372/28; 372/29; 372/31; 372/33; 372/81; 372/83
[58] Field of Search ............... 372/32, 31, 28, 81, 372/83, 33, 29

[56] References Cited

U.S. PATENT DOCUMENTS

| | | | |
|---|---|---|---|
| 3,689,851 | 9/1972 | Corcoran et al. | 372/32 |
| 3,898,583 | 8/1975 | Shuey | 372/33 |
| 4,660,206 | 4/1987 | Halmos et al. | 372/28 |
| 4,662,741 | 5/1987 | Duvall, III et al. | 356/5 |
| 4,666,295 | 5/1987 | Duvall, III et al. | 356/5 |
| 4,669,086 | 5/1987 | Kaede et al. | 372/32 |
| 4,694,458 | 9/1987 | Midavaine et al. | 372/32 |
| 4,698,817 | 10/1987 | Burley | 372/33 |
| 4,745,614 | 5/1988 | Egawa et al. | 372/33 |
| 4,796,996 | 1/1989 | Burns | 372/29 |
| 4,821,273 | 4/1989 | Hori | 372/32 |

FOREIGN PATENT DOCUMENTS

| | | | |
|---|---|---|---|
| 0125823 | 11/1984 | European Pat. Off. | 372/33 |
| 0088790 | 6/1982 | Japan | 372/29 |
| 0223179 | 11/1985 | Japan | 372/33 |
| 0088582 | 5/1986 | Japan | 372/32 |
| 0229383 | 10/1986 | Japan | 372/33 |

OTHER PUBLICATIONS

R. L. Shoemaker et al., "Frequency-Switchable CO₂ Laser: Design and Performance;" *Applied Optics*, Mar. 1, 1982; vol. 21; No. 5; pp. 961–966.

Primary Examiner—William L. Sikes
Assistant Examiner—Xuân Thi Vo
Attorney, Agent, or Firm—Joseph E. Szabo

[57] ABSTRACT

A radio frequency excited carbon dioxide laser (50) is stabilized by sensing (66) variation in output power to generate a feedback signal (68, 78) that is employed to vary amplitude of the radio frequency exciting signal from a power source (62). Frequency modulation of the laser output is achieved by varying the amplitude of the radio frequency signal from a power source (62) in response to a frequency modulating control signal from a modulation source (74). Both stabilization and frequency modulation are accomplished by combining the sensed power feedback signal with the frequency modulation control signal in a summing circuit (70) and employing the combined signal to vary magnitude of the radio frequency exciting signal.

15 Claims, 2 Drawing Sheets

LASER FREQUENCY CONTROL

BACKGROUND OF THE INVENTION

1. Field of the Invention

The present invention relates to electrically excited lasers and more particularly concerns improved methods and apparatus for accomplishing one or both of stabilization and frequency modulation of an electrically excited laser.

2. Description of Related Art

Variation of laser frequency is important in applications such as spectroscopy, optical communications, and laser radar. Frequency stabilization also is important in many applications. Frequency stabilization of a laser is required because frequency will change or drift for a number of reasons, primarily those which change the laser temperature. As the laser temperature changes, its effective cavity length changes, thereby changing cavity resonant frequency. In the past, frequency control for either stabilization or frequency modulation has been accomplished by several different techniques. For example, one of the laser cavity mirrors has been mounted to a piezoelectric transducer which has been energized with a frequency modulating signal or with a stabilizing feedback signal so as to change the length of the resonant cavity of the laser, and thus change its frequency. However, the piezoelectric transducer exhibits non-linear and hysteresis effects which degrade its frequency control or stabilization.

Another form of frequency modulation (frequency switching) for frequency chirp laser radar is described in an article entitled "Frequency-switchable $CO_2$ laser: design and performance" by R. L. Shoemaker, R. E. Scotti, B. Comaskey, and Jose Soto M. in *Applied Optics*, Mar. 1, 1982/Vol. 21, No. 5, pages 961 through 966.

In the system described in the article of Shoemaker, et al, an electro-optic modulator crystal, such as a cadmium teluride (CdTe) crystal, is mounted inside the laser cavity and subjected to a high voltage which produces rapid switching of laser output frequency. A scheme similar to that of the Shoemaker et al article is described in U.S. Pat. Nos. 4,666,295 for Linear FM Chirp Laser of Robert L. Duvall III, et al, and 4,660,206 for Chirp Laser Stabilization System of Halmos et al, both assigned to the assignee of the present application. These patents describe laser radar transmitters.

Other modulation techniques proposed include intracavity rotating spiral ramp, a translating linear grating and a rotating circular grating. However, such techniques have not been successfully implemented insofar as the applicants are aware. In any event, even if such techniques are implemented, they would involve exceedingly expensive components and manufacturing techniques, and high complexity. Thus, present known techniques for laser frequency control are costly, complex and inefficient. It is an object of the present invention to provide laser frequency control, stabilization, or both, that is effective, efficient, relatively simple, and relatively inexpensive.

SUMMARY OF THE INVENTION

Applicants provide frequency control by a simple arrangement that does not require use of prior art techniques, nor use of electro-optic or crystals or other devices in the laser cavity. In carrying out principles of the present invention, in accordance with a preferred embodiment thereof, laser frequency control is accomplished in a laser that is excited by an electrical signal from an exciting power source by varying magnitude of the electrical exciting signal. The exciting signal variation is produced in response to one or both of a frequency modulating control signal and a feedback signal representing change in laser output power.

DESCRIPTION OF THE PREFERRED EMBODIMENT

Figure 1:
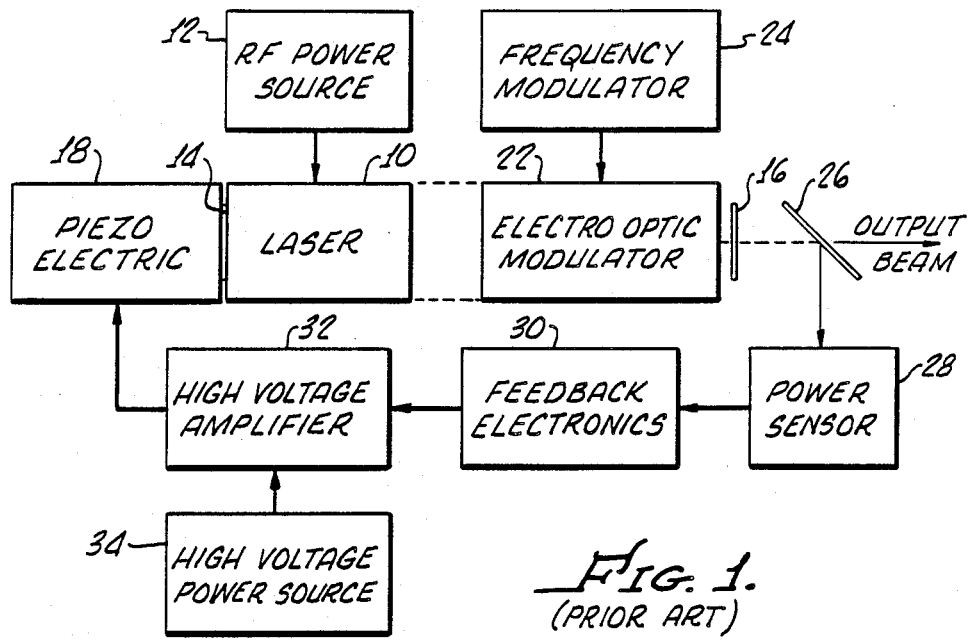
FIG. 1 is a block diagram of a prior art system for rapid frequency switching and stabilization of a laser.

Illustrated in FIG. 1 is a prior art system having a feedback loop for laser stabilization and an intracavity electro-optic modulator for rapid switching of the laser output from one frequency to another. This prior art system is similar to those shown in U.S. Pat. No. 4,666,295 and in the Shoemaker et al article, identified above. In these prior art systems, a carbon dioxide ($CO_2$) laser 10 is electrically pumped or excited by a source of radio frequency power 12 to provide laser oscillations within a laser cavity defined between a rear cavity mirror 14 and a forward cavity output mirror 16. Rear mirror 14 is mounted upon a piezoelectric crystal 18. An electro-optic modulator, such as cadmium teluride (CdTe) crystal modulator 22 is positioned within the laser cavity adjacent the output mirror 16. A modulating voltage applied to the crystal modulator changes its index of refraction, thereby changing optical path length of the laser resonating cavity and shifting the laser frequency. The modulating voltage is applied in the form of a frequency shifting step signal from a frequency modulator 24.

Stabilization of the prior art system is provided by feeding the laser output beam through a beam splitting prism 26 from which a part of the beam energy is transmitted to a laser power sensor 28, such as for example, a pyroelectric detector or a mercad teluride (HgCdTe) detector. The output signal of the detector is fed to a feedback dither stabilizing electronic circuit 30, providing a dither feedback signal that is amplified in a high voltage amplifier 32 supplied with power from a high voltage power source 34. The output of amplifier 32 is applied to the piezoelectric crystal 18 to change position of the rear reflector of the resonant cavity in a sense such as to maintain the laser operation at a selected point relative to the center or peak of the laser gain curve.

Applicants have discovered simple, effective and efficient techniques for controlling frequency of an electrically excited laser. Frequency is controlled to effect stabilization and modulation. Applicants have been able to accomplish either one or both of stabilization of laser frequency and frequency modulation of the laser output beam simply by adjusting magnitude of the radio frequency power applied to an RF excited waveguide laser. No intracavity devices, piezoelectric crystals, nor costly high voltage electronics are needed in applicants arrangement.

In applicants arrangement, like the prior art, stabilization is based at least in part upon control of effective cavity length such that cavity resonance corresponds to the center of the laser gain curve. At this resonant frequency, which is the center of a lasing line, a power maximum occurs. Therefore, sensing variation in laser output power and generating a feedback signal representing change in power may be used to accomplish frequency control. However, where the prior art employs a piezoelectric crystal to change the laser frequency, applicants employ the radio frequency exciting power source itself. Applicants adjust magnitude of the radio frequency exciting signal applied to the laser exciting electrodes in a manner to keep the effective cavity length and therefore the frequency constant. Thus use of the prior expensive and troublesome piezoelectric crystal and related high power components to accomplish stabilization is avoided. Not only is frequency of the laser stabilized at the center of the laser gain curve for optimum power by control of RF excitation power, but such control also provides for simple, efficient and effective frequency modulation of the laser. A small modulation control signal may be combined with the feedback stabilizing signal so as to adjust magnitude of the radio frequency exciting signal applied to the laser in response to both the feedback stabilization signal and a frequency modulation control signal. Thus laser frequency is stabilized at the center of its gain curve and may be modulated around the center line of this curve. Either frequency control or stabilization may be employed without the other.

Figure 2:
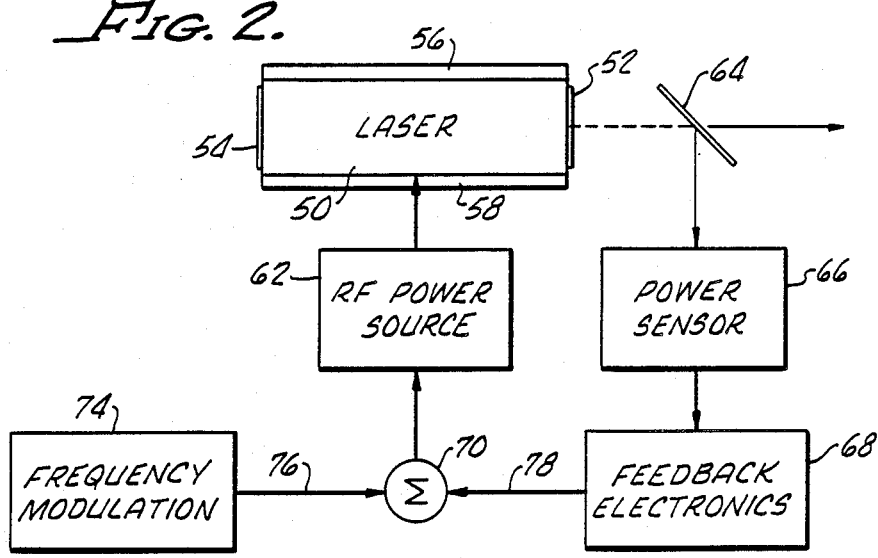
FIG. 2 is a block diagram of a laser system embodying principles of the present invention for stabilization and frequency control.
Figure 3:
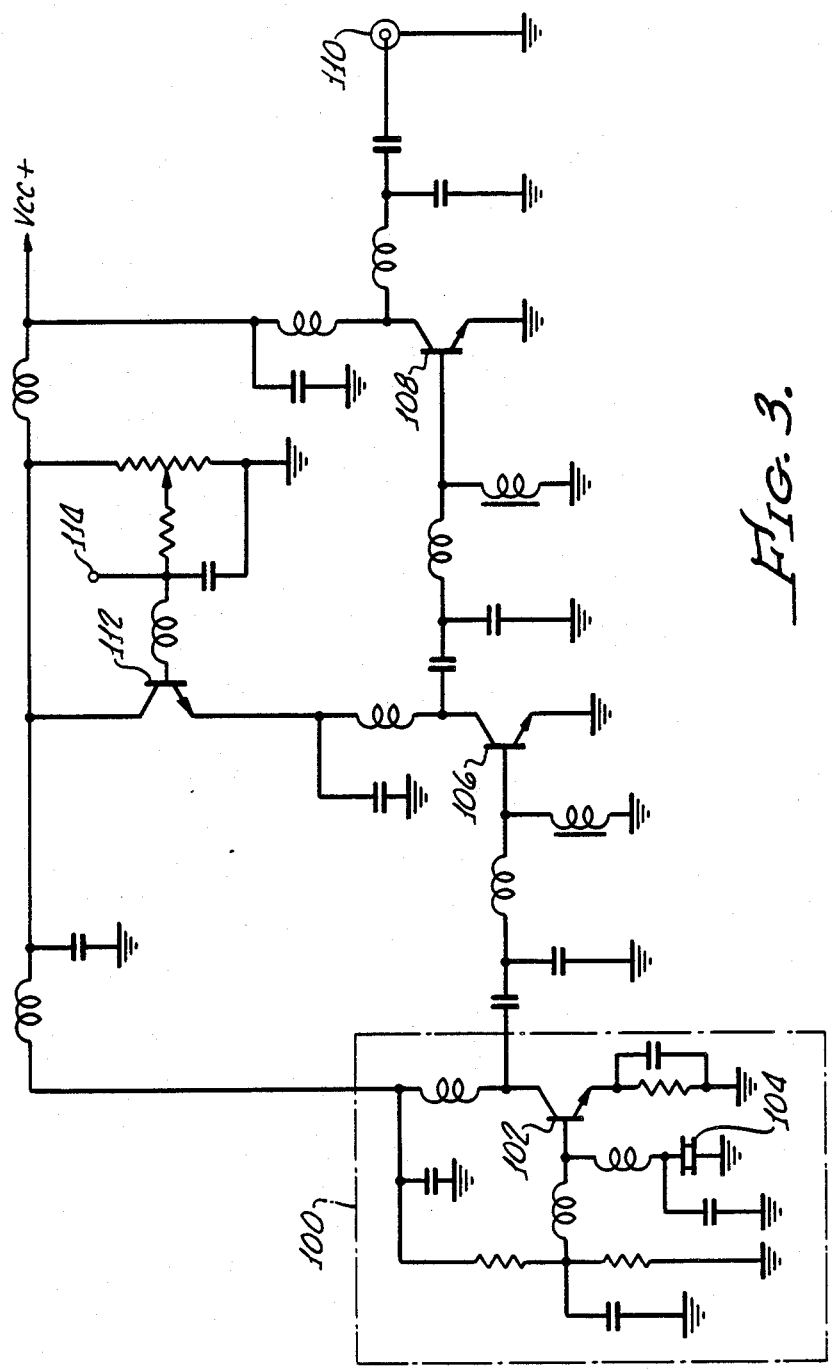
FIG. 3 is a circuit diagram of an RF power supply having modulation input.

FIG. 2 is a block diagram of a radio frequency excited $CO_2$ waveguide laser embodying principles of the present invention. The laser body, preferably of a ceramic or other dielectric, is formed to define a resonant cavity 50 between front and back mirrors 52,54. The front mirror 52, as is well known, is made partially transmissive so as to project the desired laser output beam from the laser through the front mirror. Exciting electrodes 56,58 are mounted to the body within the cavity and extend for substantially the full length of the cavity along the length of the laser body. Both of electrodes 56,58 are connected to receive a radio frequency pumping or exciting signal from a radio frequency power source 62 of substantially conventional configuration. A circuit of an exemplary RF source is shown in FIG. 3 and described below.

A conventional lasing medium, such as a mixture of carbon dioxide, helium and nitrogen gas confined in the laser cavity is caused to experience a population inversion by the exciting power source, and thus generates energy oscillations within the cavity between the front and rear mirrors. Applicants have found that the frequency of these energy oscillations varies as the RF exciting signal amplitude is varied. It is believed that variation of the RF excitation amplitude changes the index of refraction of the lasing gas in the waveguide cavity. This causes a change in the effective cavity dimensions, and therefore, a change in the laser frequency. A substantially linear relation has been observed between change in amplitude of the RF exciting signal from the power source 62 and change in frequency of the laser output beam.

For frequency stabilization, a feedback loop is provided to control the RF power source. Thus, a beam splitting prism 64 reflects a portion of the output beam to a power sensor 66, which may be the same as the prior art power sensors previously described, and sends a feedback signal, representing laser output power, to a feedback electronic circuit 68, which provides a feedback dither signal to the RF power source. Change in frequency of oscillations within the laser cavity changes power of the projected output beam. Therefore, in one sense, the power sensor 66 effectively senses laser frequency. The feedback signal from circuit 68 is fed to a summing network 70, the output of which is applied to the RF power source 62 so as to change the amplitude of the RF pumping or exciting signal provided from the power source to the two laser electrodes. Such change in amplitude is substantially proportional to amplitude of the output signal from summing circuit 70.

The feedback stabilization operation for prior systems (FIG. 1) has been to dither the end mirror (14) with a piezoelectric crystal 18 and use the attendant output power fluctuation to generate a correction signal. Details of another way to obtain stabilization are shown in U.S. Pat. No. 660,206. Techniques of the prior art may be used in the present invention, except that the effective cavity length is dithered by a change in the RF exciting signal, instead of by operation of a piezoelectric crystal.

In order to frequency modulate the laser output energy beam, a source 74 of frequency modulation control signal is fed via a line 76 to a second input of summing network 70, which combines the frequency modulation control signal with the feedback signal on line 78, and thus provides further controllable variation of the RF power source output amplitude. The frequency modulation signal from source 74 may be a step signal as required for the rapid frequency shifting of a chirp laser radar, or it may be a smoothly varying signal as desired for other types of frequency modulation.

In general, the frequency modulation is at a much higher frequency than the dither frequency. Thus the two controls, frequency modulation control and feedback control for stabilization, may be readily separated, in effect, as by suitable filters, for example, in the feedback electronics. Effectively, the frequency modulation and stabilization, if used together, are made to operate independently of each other, as by use of filters or by applying the two alternatively. For example, stabilization may be engaged for short intervals that are separated by longer intervals during which frequency modulation is employed. When using stabilization, the frequency modulation is disabled and vice versa. When used together, by adding a small frequency modulation signal to the feedback signal from the dither stabilizing electronic circuit, the laser frequency is caused to vary around the center of its lasing line.

FIG. 3 shows the circuit of an exemplary radio frequency power supply that may be employed for excitation and frequency control of the laser of the system described above. This power supply is basically a conventional circuit embodying a crystal controlled oscillator, shown in dotted box 100, having a circuit oscillating around a transistor 102 under control of a crystal 104. The collector output of oscillator transistor 102 is coupled to a first stage of amplification including a transistor 106. Output of this stage of amplification is fed to a second stage of amplification, including a transistor 108, to the collector of which is coupled the RF source exciting signal output terminal 110.

Amplification provided by the second amplifying stage, and thus output power, is controlled by a circuit including a power controlling transistor 112 having its emitter coupled via an LC circuit to the collector of the second stage transistor 106. Voltage at the emitter of controlling transistor 112, and thus at the collector of the second stage transistor 106, is varied by controlling the current to its base in response to the modulation input signal at input terminal 114.

Variation of amplitude of the modulation input (whether AC or DC or both) change the base current of transistor 112 to thereby change amplification of the first stage amplifier transistor 106, and thus change amplitude and power of the RF exciting signal at output terminal 110.

The invention has been mechanized in a carbon dioxide waveguide cavity laser, having a cavity width and height of 0.080" by 0.80" and a length of 7.75". RF excitation frequency is 74.5 MHz, nominal input power is 50W and nominal output power is 2.5W. The lasing wavelength is 10.6 micrometers. With an amplitude modulation of three percent on the RF exciting signal output, a frequency shift of 10 MHz has been measured in the laser output.

Certain aspects of the laser design can be optimized for enhancing the frequency shifting effect of amplitude modulation of the RF exciting signal. Thus, decreasing cross sectional dimensions of the laser cavity will cause the laser to be more sensitive to amplitude variation of the RF exciting signal. For example, a waveguide having a cavity width of 100 mils would be redesigned specifically for the described frequency modulation technique so as to have a cavity width of 80 mils, and thus exhibit significantly higher sensitivity to the controlled variation of amplitude of its RF excitation signal.

Although the invention has been described in an exemplary embodiment of a $CO_2$ waveguide laser that is radio frequency excited, it will be understood that the invention is also applicable to other types of lasers employing other lasing media, and is also applicable to those lasers that are DC excited.

What is claimed is:

1. A laser comprising:
means for defining a lasing cavity,
a lasing medium in said cavity,
exciting means for applying excitation energy to said lasing medium to produce energy oscillations within said cavity,
output means for transmitting an output energy beam from the cavity at a selected frequency,
power sensing means for sensing variation of the power of said output energy beam and providing a feedback signal indicative of sensed power,
power supply means for supplying an excitation signal to said exciting means, and
frequency control means for varying frequency of said energy oscillations, said frequency control means comprising excitation power control means responsive to said power sensing means for varying magnitude of said excitation signal to thereby vary said selected frequency.

2. A laser comprising:
means for defining a lasing cavity,
a lasing medium in said cavity,
exciting means for applying excitation energy to said lasing medium to produce energy oscillations within said cavity,
output means for transmitting an output energy beam from the cavity at a selected frequency,
power supply means for supplying an excitation signal to said exciting means, and
frequency control means for varying frequency of said energy oscillations, said frequency control means comprising excitation power control means for varying magnitude of said excitation signal to thereby vary said selected frequency, said excitation power control means comprising frequency modulation means for generating a frequency modulating signal that represents a frequency modulation to be imposed upon said output energy beam, and means responsive to said modulating signal for frequency modulating said excitation signal.

3. A laser comprising:
means for defining a lasing cavity,
a lasing medium in said cavity,
exciting means for applying excitation energy to said lasing medium to produce energy oscillations within said cavity,
output means for transmitting an output energy beam from the cavity at a selected frequency,
power supply means for supplying an excitation signal to said exciting means, and
frequency control means for varying frequency of said energy oscillations, said frequency control means comprising excitation power control means for varying magnitude of said excitation signal to thereby vary said selected frequency, said power supply means comprising a radio frequency power supply, and wherein said excitation power control means comprises a frequency modulator for generating a frequency modulating signal, and means for feeding the modulating signal to said power supply means to impress upon said output energy beam a frequency modulation represented by said modulating signal.

4. The laser of claim 3 including means responsive to energy oscillations in said cavity for generating a feedback signal indicative of frequency of said oscillations, and means for combining said feedback signal with said modulating signal to produce a combined signal, said means for feeding comprising means for feeding said combined signal to said power supply means.

5. A method of controlling frequency of a radio frequency excited laser comprising the steps of:
confining a lasing medium in a laser cavity,
applying radio frequency electrical exciting energy to the laser cavity to generate energy oscillations in said cavity at a selected frequency,
projecting a beam of said energy oscillations from the cavity,
sensing variation of power of said projected beam, and
varying magnitude of said radio frequency exciting energy in response to sensed variation of power of said projected beam to thereby control the frequency of said energy oscillations.

6. The method of claim 5 wherein said step of varying magnitude comprises generating a feedback signal indicative of sensed variation of power of the projected energy beam, said step of varying magnitude of said exciting energy comprising varying the magnitude of said exciting energy in accordance with said feedback signal.

7. The method of claim 5 wherein said step of applying electrical exciting energy to the laser cavity comprises providing a radio frequency power source, and feeding a radio frequency exciting signal from the power source to the laser cavity, and wherein said step of varying magnitude of said exciting energy comprises the steps of providing a source of frequency modulating signal, and frequency modulating the amplitude of said radio frequency exciting signal in accordance with said frequency modulating signal.

8. The method of claim 7 including the step of stabilizing energy oscillations in said cavity, said step of stabilizing comprising sensing power of said projected energy beam, developing a feedback signal indicative of said sensed power, said step of varying magnitude comprising combining said feedback signal with said modulating signal and modulating said radio frequency signal by both said modulating signal and said feedback signal.

9. A frequency stabilized RF excited laser comprising:
means for defining a resonant laser cavity,
a lasing medium disposed within said cavity,
RF power source means for generating an RF exciting signal,
means for applying said RF exciting signal to said laser cavity, thereby generating energy oscillations in the cavity,
said laser cavity including means for projecting an output energy beam from the cavity,
sensor means responsive to variation in power of said output energy beam for generating a feedback signal indicative of sensed variation in power of said beam, and
means responsive to said feedback signal for controlling said RF source means so as to change the magnitude of said RF exciting signal in a sense to decrease sensed variation in power and to stabilize frequency of said output energy beam.

10. The laser of claim 9 including frequency modulator means for generating a frequency modulation signal, and means for combining said frequency modulation signal with said feedback signal to generate a combined signal, said means for controlling said power source means comprising means for applying said combined signal to said power source means so as to vary the magnitude of the exciting signal in accordance with the combined magnitude of said frequency modulation signal and said feedback signal, to thereby frequency stabilize and frequency modulate said output energy beam.

11. A frequency modulated laser comprising:
means for defining a laser cavity having cavity reflectors,
a lasing medium in said cavity,
a plurality of exciting electrodes coupled with said cavity,
a radio frequency power supply for generating a radio frequency exciting signal,
means for applying the exciting signal to said exciting electrodes, whereby the laser medium within said cavity will produce energy oscillation within the cavity for transmission of an output energy beam from the cavity,
sensor means for detecting power of said output energy beam,
feedback electronic circuit means responsive to said sensor means for generating a feedback dither signal indicative of change in frequency of said output energy beam,
modulator means for generating a frequency modulating signal,
means for combining said feedback signal and said frequency modulating signal to generate a combined control signal, and
means for feeding said combined control signal to said radio frequency power supply to vary amplitude of said radio frequency exciting signal in accordance with both said frequency modulating signal and said feedback dither signal.

12. A stabilized laser comprising:
means for defining a laser cavity having cavity reflectors,
a lasing medium in said cavity,
a plurality of exciting electrodes coupled with said cavity,
a radio frequency power supply for generating a radio frequency exciting signal,
means for applying the exciting signal to said exciting electrodes, whereby a laser medium within said cavity will produce energy oscillations within the cavity for transmission of an output energy beam from the cavity,
sensor means for detecting power of said output energy beam,
feedback electronic circuit means responsive to said sensor means for generating a feedback dither signal indicative of change in frequency of said output energy beam, and
means for feeding said feedback dither signal to said radio frequency power supply to vary the amplitude of said radio frequency exciting signal in accordance with said feedback dither signal.

13. A frequency modulated laser comprising:
means for defining a laser cavity having cavity reflectors,
a lasing medium in said cavity,
a plurality of exciting electrodes coupled with said cavity,
a radio frequency power supply for generating a radio frequency exciting signal,
means for applying the exciting signal to said exciting electrodes, whereby a laser medium within said cavity will produce energy oscillations within the cavity for transmission of an output energy beam from the cavity,
frequency modulator means for generating a frequency modulating signal representing a desired in frequency modulation of said output energy beam, and
means for feeding said frequency modulating signal to said radio frequency power supply to vary the amplitude of said radio frequency exciting signal in accordance with said frequency modulating signal, thereby varying frequency of said output energy beam.

14. A radio frequency excited laser comprising:
means for defining a lasing cavity,
a lasing medium in said cavity,
exciting means for applying, radio frequency excitation energy to said lasing medium to produce energy oscillations within said cavity,
output means for transmitting an output energy beam from the cavity at a laser frequency,
radio frequency power supply means for supplying a radio frequency excitation signal to said exiting means, and
frequency control means for varying frequency of said energy oscillations, said frequency control means comprising sensing means for sensing variation of power of said output energy beam and for generating a frequency control signal for controlling frequency of said energy oscillation, and means in said radio frequency power supply means and responsive to said frequency control signal for varying magnitude of said radio frequency excitation signal.

15. A laser comprising:

means for defining a laser cavity, a lasing medium in said cavity, exciting means for applying excitation energy to said lasing medium to produce energy oscillations within said cavity, output means for transmitting an output energy beam from the cavity at a laser frequency, power supply means for supplying an excitation signal to said exciting means, and frequency control means for varying frequency of said energy oscillations, said frequency control means comprising excitation power control means for generating a frequency control signal for controlling frequency of said energy oscillation, and means in said power supply means and responsive to said frequency control signal for varying magnitude of said excitation signal said means for generating a frequency control signal comprising frequency modulation source means for generating said frequency modulation control signal in accordance with a predetermined frequency modulation to be imposed upon said output energy beam.

* * * * *